J. SCHREIBER.
SELF PROPELLED SLED DEVICE.
APPLICATION FILED MAY 13, 1919.
1,320,280.
Patented Oct. 28, 1919.
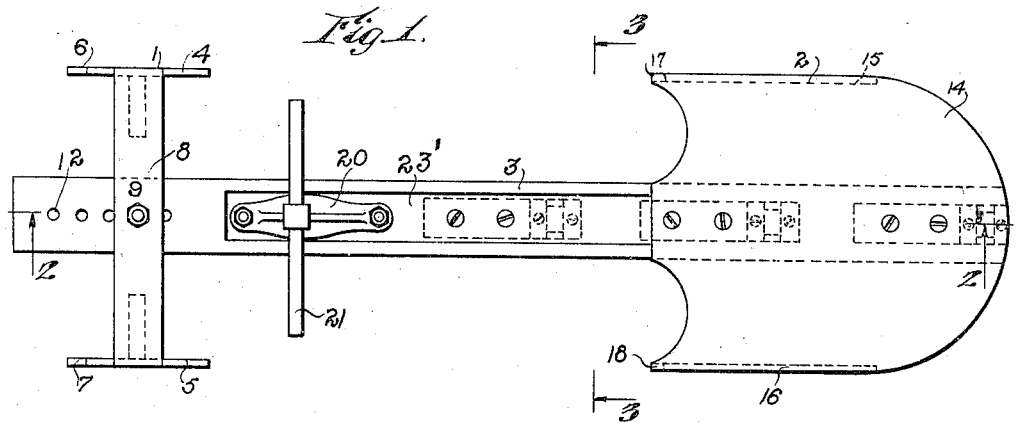
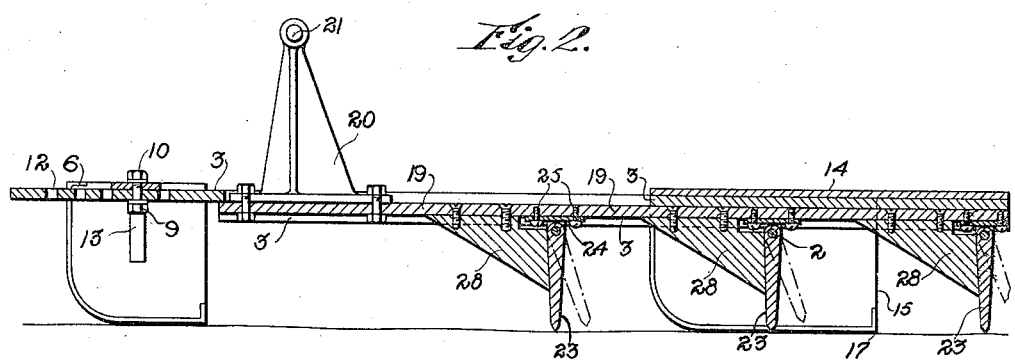
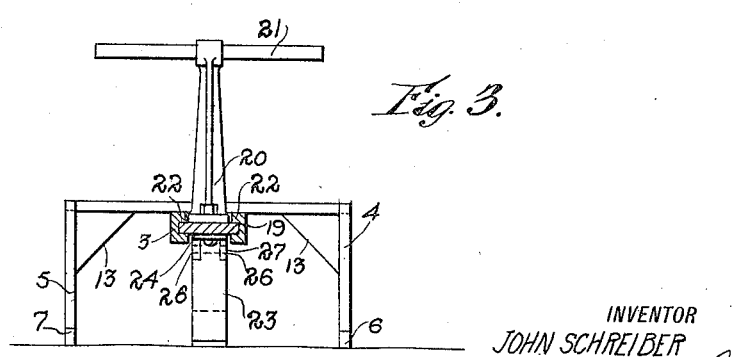
WITNESSES
INVENTOR
JOHN SCHREIBER
BY
ATTORNEYS

UNITED STATES PATENT OFFICE.

JOHN SCHREIBER, OF JERSEY CITY, NEW JERSEY.

SELF-PROPELLED-SLED DEVICE.

1,320,280. Specification of Letters Patent. Patented Oct. 28, 1919.

Application filed May 13, 1919. Serial No. 296,748.

*To all whom it may concern:*

Be it known that I, JOHN SCHREIBER, a citizen of the United States, and a resident of Jersey City, in the county of Hudson and State of New Jersey, have invented a new and Improved Self-Propelled-Sled Device, of which the following is a full, clear, and exact description.

This invention relates to a new and improved sled and more particularly to a device therefor which will permit the sled to be self-propelled when used on substantially level ground.

One of the objects of this invention is to provide a sled of simple, strong and durable construction with its parts so arranged that the sled may be readily propelled by the occupant when used on a relatively level snow or ice-covered surface.

Heretofore there have been various attempts made to produce a self-propelled sled but due to the complex and poor arrangement of the parts the sled has been unsuited for the purpose.

A further object of this invention is to produce a sled of rugged construction which may be propelled on a relatively level snow or ice surface by providing a sliding member which may be operated by the hands to move the sled forward. This is accomplished by providing in a sled a sliding member having hinged thereto downwardly extending propelling blades and a fixed bracing member forward thereof, all of which is so constructed and arranged that when the slide is moved forward, the blades drag or are moved freely to the rear, but when the slide member is moved to the rear, the propelling blades abut against the bracing member assuming a substantially vertical position so that the ends thereof catch or dig into the surface, thus affording a footing so that a continued application of a force applied to the slide through the handle will propel the sled forward instead of the blades being moved rearwardly. For continued forward movement of the sled, the process is merely repeated.

Other objects and advantages will appear from the following description and the accompanying drawings, in which similar characters of reference designate like parts in the several views.

In the drawings showing one of the preferred forms of this invention—

Figure 1 is a plan view of the sled embodying this invention.

Fig. 2 is a vertical sectional view looking in the direction of the arrows and taken upon the line 2—2 of Fig. 1.

Fig. 3 is a sectional view looking in the direction of the arrows and taken on the line 3—3 of Fig. 1.

In the preferred form the invention is shown as embodied on a sled comprising two sled portions, a forward or steering sled 1, upon which the feet of the user may rest, and a rear or following sled 2 upon which the user may be seated, said sleds being spaced and connected by a longitudinally extending member 3. The forward sled comprises the sides 4, 5 carrying suitable runners 6, 7, the said sides being connected at the tops by the laterally extending member 8, the latter being connected to the forward part of the longitudinally extending member by a suitable means, such as a bolt 9 and nut connection 10, to permit the said forward sled member to be moved so that it may be moved or swung to steer the sled. A series of openings 12 are provided to enable the distance between the forward and rear sled members to be adjusted. A suitable bracing member 13 may be used to maintain the laterally extending member 8 and the sides 4, 5 respecticely in their proper position.

The opposite end of the longitudinally extending member 3 is connected or secured by a suitable means to the seat 14 of the rear sled member 2, the said seat having connected therewith the two sides 15, 16 to which the runners 17, 18 respectively, are attached. Another longitudinally extending member 19 is slidably carried with respect to the first-named relatively fixed longitudinal member 3, there being connected to the longitudinal member 19 by suitable means a bracket 20 having a handle 21, which may be grasped by the hands of the occupant of the sled while sitting on the seat 14 so that a relative reciprocating longitudinal movement may be obtained between the members 19 and 3. In the preferred construction shown for permitting this movement the member 3 is provided with a groove 22 to permit the member 19 to slide therein, and the top of the member 3 is cut away forming a longitudinal slot or opening 23' to permit the upwardly extending bracket 20 to pass therethrough and to permit the relative sliding movement between the members 3 and 19.

As a means of propelling the sled forward when the handle 21 is moved rearwardly, the sled propelling blades or vein members 23 extending downwardly from and hingedly secured to the member 19 are provided. Any suitable means may be used to furnish a hinged connection between the blades 23 and sliding member 19, the means shown in the preferred form comprising a bracket 24 which is connected to the member 19 by the screws 25, there being downwardly extending lugs 26 on said brackets 24, having openings therein, through which a pin 27 extends, the pin acting as a support for the propelling blades 23 and permitting the blades to swing or hinge thereon. The propelling blades 23 extend downwardly a sufficient distance so that the lower edge thereof will be substantially in alinement with the bottom of the runners 6, 7, 17 and 18 so that when in a vertical position, the bottom edge thereof will engage the coating of ice or snow on the surface below. To act as a support or brace for the propelling members 23 when the handle 21 is moved rearwardly to propel the sled forward and when the lower edge of said blades engage the surface beneath the sled, there is provided the bracing members 28 which are secured by a suitable means to the member 19, one of the edges of the bracing member being positioned with respect to the propelling blades so that when said blades are in a substantially vertical position, they will abut against the bracing member 28 and will thus act as a reinforcement or support therefor, thus relieving the strains which otherwise would exist at the hinged point of support and the blades.

It is to be understood that the various parts of the sled may be made of any suitable wood or metal material.

The essential feature of applicant's construction herein described consists in providing the downwardly extending hinged blades from the longitudinally extending sliding member and the provision of a bracing support for said blades when in a functioning position, the blades being hinged and supported so that when the sliding member is moved forwardly of the sled, the blades may freely move rearwardly about their point of support. It is thus seen that by such a construction herein shown and described, there is obtained a simple, strong and rigid construction.

While there has herein been shown but one preferred form of structure, certain changes and modifications may be made without departing from the spirit and scope of this invention.

Having thus described the invention, what I claim as new is:

1. In a device of the character described, a sled and a propelling means therefor, said means including a slidable member, a downwardly extending propelling blade freely pivotally supported from said sliding member and a vertically extending brace for said blade carried by said sliding member.

2. A device of the character described comprising a sled and a propelling device therefor, said device comprising a longitudinally movable member, a handle rigid therewith, downwardly extending propelling blades freely hinged to said longitudinally movable member and a vertically extending brace carried by the sliding member and arranged to maintain said blades in a functioning position.

3. In a sled, a propelling means therefor comprising a longitudinally movable member, a handle fixed thereto, a downwardly extending propelling blade freely hinged to said movable member and a vertically extending bracing member therefor, said propelling blade and bracing member being arranged to permit the said blade to swing freely when the movable member is moved in one direction and to be held in a substantially vertical position when moved in the opposite direction.

4. In a sled, a propelling means therefor comprising a longitudinally sliding member, a bracing member fixed thereto and extending downwardly therefrom, a handle fixed thereto and a downwardly extending propelling blade freely hinged to said slidable member, said bracing member functioning to support and limit the movement of said propelling blade in one direction.

5. In a sled, a propelling means therefor including a longitudinally sliding member, a handle rigid therewith, a series of downwardly extending propelling blades freely hinged on said sliding member to permit said blades to turn freely about the hinged point when the sliding member is moved in one direction and a vertically extending stop carried by the sliding member in alinement with the blades to limit the movement of the hinged blade and hold it in operative position when the longitudinally slidable member is moved in the opposite direction.

JOHN SCHREIBER.

Copies of this patent may be obtained for five cents each, by addressing the "Commissioner of Patents, Washington, D. C."